UNITED STATES PATENT OFFICE.

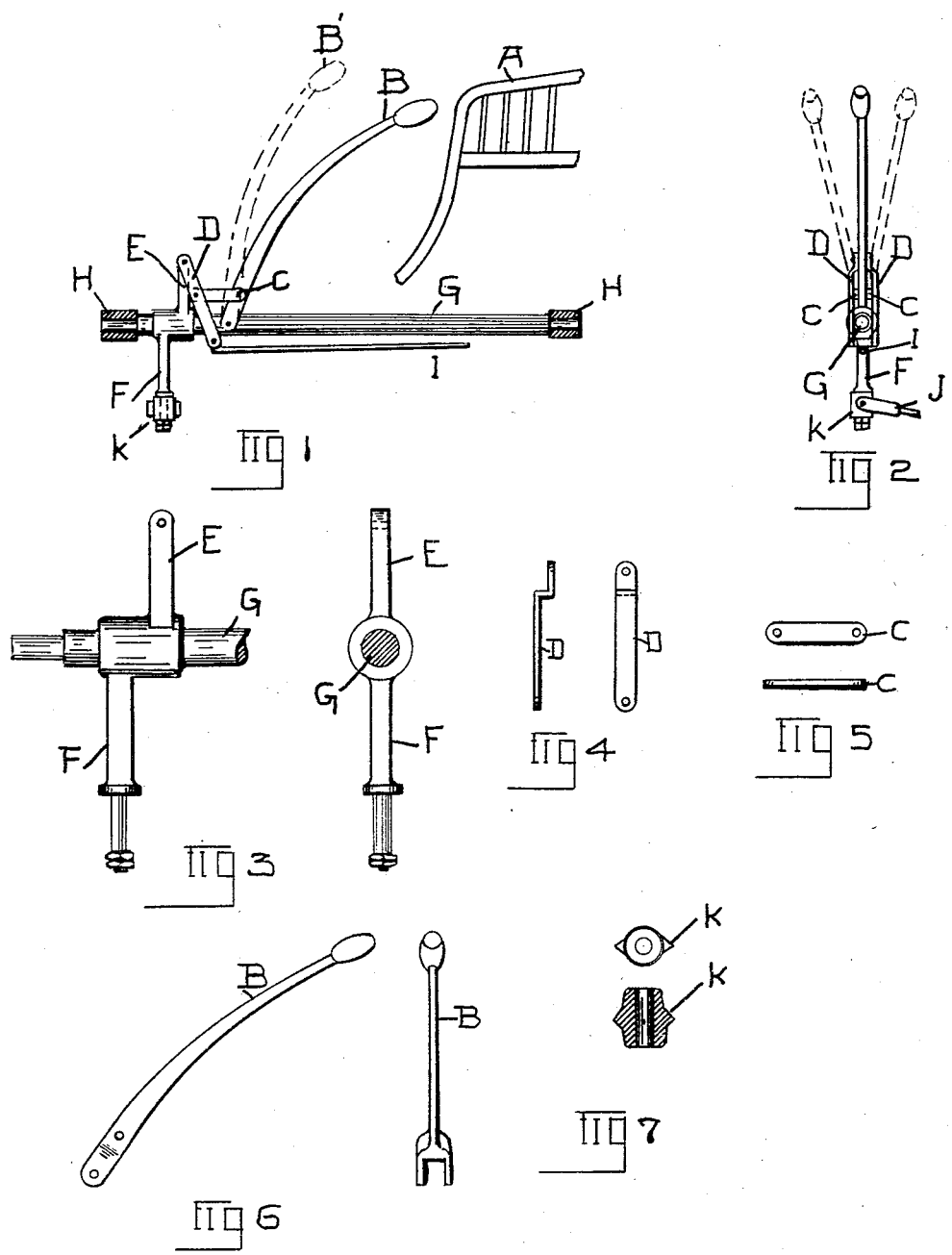

CHRISTIAN F. WEEBER, JR., OF ALBANY, NEW YORK.

STEERING AND BRAKING DEVICE.

SPECIFICATION forming part of Letters Patent No. 704,156, dated July 8, 1902.

Application filed December 13, 1901. Serial No. 85,756. (No model.)

*To all whom it may concern:*

Be it known that I, CHRISTIAN F. WEEBER, Jr., a citizen of the United States of America, and a resident of the city and county of Albany, State of New York, have invented certain new and useful Improvements in Steering and Braking Devices, of which the following is a specification.

My invention relates to steering and braking devices for automobiles; and the object of my invention is to equip an automobile with a device by which the steering and braking may be accomplished by the movement of the same handle and that both operations may be performed at the same time. I accomplish this object by means of the mechanism illustrated in the accompanying drawings, in which—

Figure 1 is a side view of my device. Fig. 2 is an end view of the same. Fig. 3 is a front and end view of a portion of the rocking shaft, showing the upright arm and the hanging arm. Fig. 4 is a front and side view of one part of the brake-lever D. Fig. 5 is a front and side view of one of the two connecting arms or straps connecting the handle with the brake-lever. Fig. 6 is a side and front view of the handle. Fig. 7 is a front and end view of the swivel by which the hanging arm of the rocking shaft is connected to the steering-knuckles.

Similar letters refer to similar parts throughout the several views.

In Fig. 1, A represents the seat of an automobile.

B is the handle, which extends within easy reaching distance of the person occupying the seat.

G is a rocking shaft under the floor of and extending lengthwise with the automobile and arranged to turn in the bearings H H.

The handle B is attached in a suitable manner to the rocking shaft G, so that it can be moved forward, as shown by the dotted line B', Fig. 1. Attached to the rocking shaft G in an upright position is the upright arm E.

I is a brake-rod extending under the rocking shaft G, to which may be attached any suitable braking device; but I prefer a band-brake operating upon the rear axle of the automobile. The brake-rod I is connected with the upright arm E by means of the brake-lever D, which is preferably composed of two halves, as shown in Figs. 2 and 5, so as to be connected, as by bolts, to the upright arm E and the brake-rod I, so as to hold the brake-rod I directly under the rocking shaft G and so that the rocking shaft G may lie and turn freely between the two parts or halves of the brake-lever D and the brake-lever can move a limited distance along the rocking shaft G.

The brake-lever D is attached to the steering-handle B by means of the connecting straps or arms C C, so that when the upper end of the handle B, which is grasped by the driver of the automobile, is raised or moved forward, as shown by dotted lines B', Fig. 1, the connecting-arm C will move the brake-lever D forward toward the front of the automobile, thus drawing the brake-rod I forward, and thus applying the brake.

Attached to the rocking shaft G is the hanging arm F, to which is attached, by means of the swivel K, the connecting-rod J, which connects the steering-knuckles of the automobile with the hanging arm F, so that by giving the handle-bar B a sidewise motion in either direction the rocking shaft G will rock and move the hanging arm F accordingly, which will give the connecting-arm J a corresponding motion, and thus turn the wheels of the automobile to any desired angle. Constructed in this manner the driver of the automobile by a single movement of one hand can apply the brake and steer the automobile and so control the speed and direction with ease and safety. By using but one hand in the operation he is not obliged to give the very close attention necessary where separate devices and different movements are used for steering and braking the machine, thus greatly lessening the liability of accident, and in case of sudden emergency the steering and braking being both accomplished by a movement of one hand gives the driver a much more perfect control of the automobile and leaves the other hand free for other purposes.

What I claim as my invention, and desire to secure by Letters Patent, is—

1. In an automobile, a steering and braking device consisting of a rocking shaft, adapted to turn in bearings attached to the automobile; a downwardly-projecting arm and an upwardly-projecting arm attached to said rocking shaft; a connecting-rod connecting the said downwardly-projecting arm with the steering-knuckles of the automobile, whereby the rocking of said shaft in its bearings will operate said steering-knuckles; a handle attached to said rocking shaft; a brake-lever attached at one end to said upwardly-projecting arm of said rocking shaft, and at the other end to the brake, by suitable intermediate connections and means for connecting said brake-lever to said handle, whereby said handle will be adapted to both operate said brake and turn said rocking shaft in its bearings, substantially as described and for the purposes set forth.

2. A braking device to an automobile consisting of a handle adapted to be operated by the driver of the automobile attached to a rocking shaft at or under the floor of the automobile; said rocking shaft adapted to turn in bearings attached to the automobile at or under the floor of the automobile; a projecting arm attached to said rocking shaft; a brake-lever attached to said projecting arm as a fulcrum and by suitable intermediate connections to the brake of the automobile and means for connecting said brake-lever to said handle, whereby said handle will be adapted to operate said brake while turning said rocking shaft in its bearings, substantially as described.

3. In a steering and braking device to an automobile, a rocking shaft adapted to turn in its bearing, two or more bearings attached to said automobile adapted to receive and retain said rocking shaft; an upwardly-projecting arm and a downwardly-projecting hanging arm attached to said rocking shaft; a connecting-rod connecting said hanging arm with the steering-knuckles of the automobile; a handle attached to said rocking shaft adapted to be operated by the driver of the automobile; a brake-rod parallel to and immediately under said rocking shaft; a brake-lever in two parts, each part connecting said brake-rod to said upwardly-projecting arm, one on each side of said rocking shaft; a connecting-arm connecting said handle to said brake-lever whereby said handle is adapted to both operate the brake-rod and turn said rocking shaft in its bearings at the same time, while maintaining the brake-rod in the same relative position to the rocking shaft, all substantially as described and for the purposes set forth.

4. In a steering and braking device to an automobile; a rocking shaft having a downwardly-projecting arm and an upwardly-projecting arm; means for connecting the downwardly-projecting arm to the steering-knuckles of the automobile; a brake-lever attached to said upwardly-projecting arm; means for connecting said brake-lever to the brake of the automobile; a handle attached to said rocking shaft and suitably connected to said brake-lever, whereby said handle is adapted to both turn said rocking shaft in its bearings and operate said brake, substantially as described and for the purposes set forth.

Signed at Albany, New York, this 7th day of December, 1901.

CHRISTIAN F. WEEBER, Jr.

Witnesses:
WALTER E. WARD,
LOTTIE PRIOR.